United States Patent
Ben Henda et al.

(10) Patent No.: US 10,904,756 B2
(45) Date of Patent: *Jan. 26, 2021

(54) AUTHENTICATION FOR NEXT GENERATION SYSTEMS

(71) Applicant: Telefonaktiebolaget LM Ericsson (publ), Stockholm (SE)

(72) Inventors: Noamen Ben Henda, Stockholm (SE); David Castellanos Zamora, Madrid (ES); Vesa Lehtovirta, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,060

(22) Filed: Feb. 20, 2020

(65) Prior Publication Data

US 2020/0196147 A1    Jun. 18, 2020

Related U.S. Application Data

(63) Continuation of application No. 15/744,192, filed as application No. PCT/EP2017/077330 on Oct. 25, 2017, now Pat. No. 10,609,556.

(Continued)

(51) Int. Cl.
*H04W 12/06* (2009.01)
*H04L 29/06* (2006.01)

(52) U.S. Cl.
CPC .............. *H04W 12/06* (2013.01); *H04L 63/08* (2013.01); *H04L 63/0892* (2013.01)

(58) Field of Classification Search
None
See application file for complete search history.

(56) References Cited

U.S. PATENT DOCUMENTS 8,145,905 B2    3/2012    Patwardhan et al.
2009/0172403 A1    7/2009    Liang et al.
(Continued)

FOREIGN PATENT DOCUMENTS

CN    102388639 A    3/2012
RU    2434353 C2    11/2011

OTHER PUBLICATIONS

Decision to Grant Patent (English Translation) dated Sep. 8, 2020 for Japanese Patent Application No. 2019-521802, 3 pages, (Year: 2020).*

(Continued)

*Primary Examiner* — Michael Pyzocha
(74) *Attorney, Agent, or Firm* — Sage Patent Group

(57) ABSTRACT

A method performed by a user equipment (UE) including establishing a primary authentication with a security anchor function, establishing a user plane (UP) session or connection with a UP function (UPF), receiving an extensible authentication protocol (EAP) based authentication request from the UPF, sending an EAP based authentication response to the UPF, and receiving an EAP based authentication result based on a verification response from an external authentication, authorization, and accounting (AAA) server. A method performed by a UPF includes establishing a UP session or connection to a UE, sending an EAP based authentication request to the UE, receiving an EAP based authentication response from the UE, forwarding the EAP based authentication response to an external AAA server, receiving a verification response from the external AAA server, and sending an authentication result to the UE based on the verification response from the external AAA server.

20 Claims, 6 Drawing Sheets

Related U.S. Application Data

(60) Provisional application No. 62/415,006, filed on Oct. 31, 2016.

(56) References Cited

U.S. PATENT DOCUMENTS

| | | |
|---|---|---|
| 2012/0269162 A1 | 10/2012 | Vesterinen et al. |
| 2017/0078874 A1 | 3/2017 | Lee et al. |
| 2017/0188223 A1 | 6/2017 | Gundavelli et al. |
| 2017/0289799 A1 | 10/2017 | Hawkes et al. |
| 2018/0014178 A1 | 1/2018 | Baek et al. |
| 2018/0063707 A1* | 3/2018 | Lee .................. H04W 12/0017 |
| 2018/0084414 A1 | 3/2018 | Lee et al. |
| 2019/0149329 A1 | 5/2019 | Wu et al. |
| 2019/0174573 A1 | 6/2019 | Velev et al. |
| 2019/0253888 A1 | 8/2019 | Jerichow et al. |
| 2019/0261178 A1* | 8/2019 | Rajadurai .......... H04L 63/0892 |

OTHER PUBLICATIONS

Examination Report for Indian Patent Application No. 201817049808 dated Jul. 29, 2020, 6 pages.

Official Action and Search Report, including English translation, for Russian Patent Application No. 2019116611/08 (031724) dated Jan. 22, 2020, 8 pages.

International Preliminary Report on Patentability, PCT/EP2017/077330, dated Oct. 5, 2018, 21 Pages.

International Search Report and Written Opinion of the International Searching Authority, PCT/EP2017/077330, dated Feb. 13, 2018, 12 pages.

Qualcomm Inc., LG Electronics: "Way Forward on Support of Non-3GPP Access and Update to Solution 8.6 for Support of Untrusted Non-3GPP Access," 3GPP S2-166283, SA WG2 Meeting #117, (Oct. 2016) Oct. 17-21, 2016, XP051170203, 10 pages.

"Technical Specification Group Services and System Aspects; Study on Architecture for Next Generation System" (Release 14) 3GPP TR 23.799 V0.4.0 (Apr. 2016) Apr. 27, 2016, XP051123441, 92 pages.

"Technical Specification Group Services and System Aspects; Study on Architecture for Next Generation System," (Release 14) 3GPP TR 23.799 V1.0.0 (Sep. 2016), 423 pages.

Aboba, B., et al., "Extensible Authentication Protocol (EAP)" RFC 3748, Jun. 2004, http://www.rfc-base.org/txt/rfc-3748.txt, 58 pages.

"Technical Specification Group Services and System Aspects; General Packet Radio Service (GPRS) enhancements for Evolved Universal Terrestrial Radio Access Network (E-UTRAN) access," (Release 13) 3GPP TS 23.401 V13.8.0. (Sep. 2016), 374 pages.

"Technical Specification Group Services and System Aspects; Study on Control and User Plane Separation of EPC Nodes," (Release 14) 3GPP TR 23.714 V14.0.0 (Jun. 2016) Jun. 22, 2016, XP051295181, 87 pages.

* cited by examiner

AUTHENTICATION FOR NEXT GENERATION SYSTEMS

CROSS REFERENCE TO RELATED APPLICATIONS

This application is a continuation of U.S. patent application Ser. No. 15/744,192 titled "Authentication for Next Generation Systems" filed Jan. 12, 2018, which is a 35 U.S.C. § 371 national stage application of PCT International Application No. PCT/EP2017/077330 filed on Oct. 25, 2017, which in turn claims domestic priority to U.S. Provisional Patent Application No. 62/415,006, filed on Oct. 31, 2016, the disclosures and content of which are incorporated by reference herein in their entirety.

TECHNICAL FIELD

The present disclosure relates to a method and apparatus for secondary authentication in a network

BACKGROUND

3rd Generation Partnership Project (3GPP) is currently developing the standards for 5G, also known as next generation (NG) systems. It is expected that 5G will support many new scenarios and use cases and will be an enabler for Internet of things (IoT). It is expected that NG systems will provide connectivity to a wide range of new devices such as sensors, smart wearables, vehicles, machines, etc. Flexibility is thus a key property in NG Systems. This is reflected in security requirement for network access that are mandating the support of alternative authentication methods and different types of credentials, compared to the usual authentication and key agreement (AKA) credentials pre-provisioned by an operator and securely stored in a universal integrated circuit card (UICC). This would allow factory owners or enterprises to leverage their own identity and credential management systems for authentication and access network security.

Among the new features in NG Systems is the concept of network slicing. A network slice (NS) is basically an instance of a core network dedicated to provide a particular service. This will allow operators to handle a wide variety of new use cases, each with different service requirements in terms of Quality of Service (QoS). For example, an operator could be running a NS for usual mobile broadband (MBB) services, in parallel with a mission critical NS for public safety services (such as Mission-critical push-to-talk (MCPTT)) requiring very low latency, further in parallel with an IoT NS for electricity meters with very low bandwidth.

Among topics being studied in relation to Network Slicing is the decoupling of authentication and authorization procedures for accessing different NSs.

SUMMARY

An object of embodiments presented herein is to enable decoupling of authentication in next generation systems.

According to a first aspect a method for secondary authentication in a network is to presented. The method is performed by a user equipment (UE), and comprises establishing a user plane (UP) session or connection with a UP function (UPF), receiving an extensible authentication protocol (EAP) based authentication request from the UPF and sending an EAP based authentication response to the UPF.

The method may further comprise establishing a primary authentication with a security anchor function (SEAF).

The method may further comprise receiving an EAP based authentication result from the UPF.

The UE may further be a next generation (NG) UE. The UPF may further be a NG UPF.

According to a second aspect a method for secondary authentication in a network is presented. The method is performed by a user plane (UP) function (UPF), and comprises establishing a user plane (UP) session or connection with a user equipment (UE), sending an extensible authentication protocol (EAP) based authentication request to the UE, and receiving an EAP based authentication response from the UE.

The method may further comprise sending a verification request of the received EAP based authentication response to an authentication, authorization, and accounting (AAA) server, and receiving a verification response from the AAA server.

The method may further comprise sending an authentication result to the UE, wherein the authentication is based on the verification response from the AAA server.

The UE may further be a next generation (NG) UE. The UPF may further be a NG UPF.

According to a third aspect a user equipment (UE) for operation in a network is presented. The UE comprises a processor, and a computer program product. The computer program product stores instructions that, when executed by the processor, causes the UE to establish a user plane (UP) session or connection with a UP function (UPF), receive an extensible authentication protocol (EAP) based authentication request from the UPF, and to send an EAP based authentication response to the UPF.

The UE may further be caused to establish a primary authentication with a security anchor function (SEAF).

The UE may further be caused to receive an EAP based authentication result from the UPF.

The UE may further be a next generation (NG) UE. The UPF may further be a NG UPF.

According to a fourth aspect a user plane (UP) function (UPF) operative in a network is presented. The UPF comprises a processor, and a computer program product. The computer program product stores instructions that, when executed by the processor, causes the UPF to establish a user plane (UP) session or connection with a user equipment (UE), send an extensible authentication protocol (EAP) based authentication request to the UE and to receive an EAP based authentication response from the UE.

The UPF may further be caused to send a verification request of the received EAP based authentication response to an authentication, authorization, and accounting (AAA) server, and receiving a verification response from the AAA server.

The UPF may further be caused to send an authentication result to the UE, wherein the authentication is based on the verification response from the AAA server.

The UE may further be a next generation (NG) UE. The UPF may further be a NG UPF.

According to a fifth aspect a user equipment (UE) for operation in a network is presented. The UE comprises means for establishing a user plane (UP) session or to connection with a UP function (UPF), means receiving an extensible authentication protocol (EAP) based authentication request from the UPF, and means for sending an EAP based authentication response to the UPF.

The UE may further comprise means for establishing a primary authentication with a security anchor function (SEAF).

The UE may further comprise means for receiving an EAP based authentication result from the UPF.

The UE may further be a next generation (NG) UE. The UPF may further be a NG UPF.

According to a sixth aspect a user plane (UP) function (UPF) operative in a network is presented. The UPF comprises means for establishing a user plane (UP) session or connection with a user equipment (UE), means for sending an extensible authentication protocol (EAP) based authentication request to the UE, and means for receiving an EAP based authentication response from the UE.

The UPF may further comprise means for sending a verification request of the received EAP based authentication response to an authentication, authorization, and accounting (AAA) server; and means for receiving a verification response from the AAA server.

The UPF may further comprise means for sending an authentication result to the UE, wherein the authentication is based on the verification response from the AAA server.

The UE may further be a next generation (NG) UE The UPF may further be a NG UPF.

According to a seventh aspect a computer program for secondary authentication in a network is presented. The computer program comprises computer program code which, when run on user equipment (UE), causes the UE to establish a user plane (UP) session or connection with a UP function (UPF), receive an extensible authentication protocol (EAP) based authentication request from the UPF, and to send an EAP based authentication response to the UPF.

The UE may further be a next generation (NG) UE The UPF may further be a NG UPF.

According to an eighth aspect a computer program for secondary authentication in a network is presented. The computer program comprising computer program code which, when run on a user plane (UP) function (UPF), causes the UPF to establish a user plane (UP) session or connection with a user equipment (UE), send an extensible authentication protocol (EAP) based authentication request to the UE, and to receive an EAP based authentication response from the UE The UE may further be a next generation (NG) UE The UPF may further be a NG UPF.

According to a ninth aspect a computer program product is presented. The computer program product comprises a computer program and a computer readable storage means on which the computer program is stored. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

One possible scenario for decoupling of authentication and authorization procedures for accessing different network slices (NSs) is the following. In order for an NG-user equipment (UE) to access a particular NS, the operator would first run a primary (usual) authentication for initial network access followed by a secondary NS-specific authentication. The secondary NS-specific authentication may possibly be under the control of a 3rd party. This is assuming trust between the 3rd party service provider and the mobile network operator (MNO) who for example is offering access and transport services to this 3rd party in a dedicated NS instance.

In long term evolution (LTE), there is a mechanism that could be relevant for the described scenario. This mechanism is described in clause 5.3.2 from TS 23.401. It is based on the so called ciphered option request and uses an information element called the protocol configuration options (PCO).

The PCO is one of the information elements in non-access stratum (NAS) messages. The PCO may be used in several types of messages such as a packet data network (PDN) connectivity request to send information transparently through an Mobility Management Entity (MME) and a serving gateway (S-GW) to a PDN-GW. For example, the PCO may include an address allocation preference indicating that the UE prefers to obtain an Internet protocol version 4 (IPv4) address only after a default bearer activation by means of dynamic host configuration protocol version four (DHCPv4).

One use case of the PCO is the transfer of password authentication protocol (PAP) and challenge handshake authentication protocol (CHAP) usernames and passwords to the PDN-GW, which then runs them through an authentication, authorization, and accounting (AAA) server for access authorization. The AAA server may be located in an external domain. Since usernames and passwords are sensitive and needs to be protected, if the UE intends to send PCO which require ciphering (e.g., PAP/CHAP usernames and passwords), the UE shall set a ciphered options transfer flag in an attach request message and send the PCO only after authentication and NAS security setup have been completed.

Figure 2:
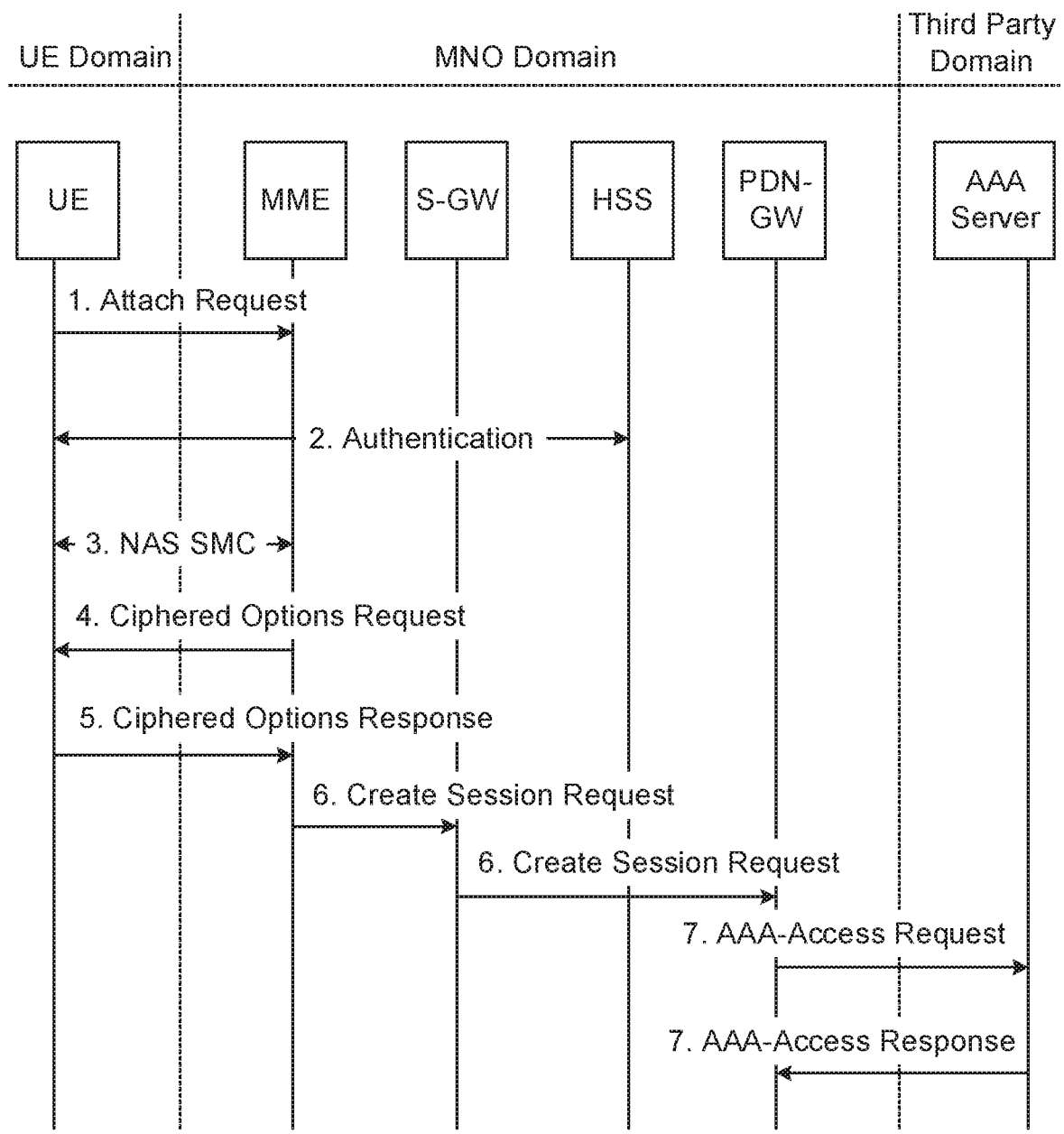
FIG. 2 schematically shows a flow for secondary authentication in LTE.

FIG. 2 shows the message flow required for running such an additional (i.e. secondary) authentication procedure through the PDN-GW in LTE. In the following, a more detailed description of the steps therein is provided.

An UE is within the UE domain. An MME, a S-GW, a home subscriber server (HSS), and a PDN-GW are within the MNO domain. An AAA server is within a third party domain.

In step 1 the UE sends an attach request message with a ciphered options transfer flag set to the MME.

In step 2 an authentication and key agreement (AKA) procedure is run between the UE and the HSS. Upon successful authentication the next steps are executed.

In step 3 a NAS security is set up, using secure mode command (SMC). After the NAS security has been set up, all NAS messages are confidentiality and integrity protected.

In step 4 the MME sends a ciphered options request message to the UE for the retrieval of the PCO.

In step 5 the UE replies with a ciphered options response message including the PAP/CHAP username and password in the PCO information element. In case the UE has subscriptions to multiple PDNs, then the UE includes an access point name (APN) in the message as well.

In step 6 the MME deciphers the received data, uses possible provided APN to identify a PDN-GW, and forwards the PCO through the S-GW to the target PDN-GW in a create session request message.

In step 7 the PDN-GW sends the received PAP/CHAP information in a diameter/radius access request message to an external AAA server. Upon success, the session creation procedure proceeds as usual.

The above steps 4-7 thus represent a secondary authentication, performed after the first authentication in step 2 has been completed. However, to use this mechanism in or extension into NG systems would provide some drawbacks.

Firstly, the mechanism is very limited in terms of possible authentication methods. Currently there is only support for PAP and CHAP. But since PAP today is obsolete from a security point of view, only CHAP is essentially possible to use.

Secondly, in order to support other methods and use the PCO information element for the transport of authentication information, the mechanism would be required to specify special messages between the MME and the S-GW and the S-GW and PDN-GW dedicated to this purpose. I.e. to handle authentication methods that require more than just one round-trip.

Furthermore, it is difficult to see how this mechanism would fit in the NG architecture, which is going to be broken further down. In fact, taking into consideration the new architectural features (TR 23.799), there will probably be more hops in the path between the UE and the PDN-GW, for example in relation to ongoing work on the split of the MME into a mobility management function (MMF) and a session management function SMF (TR 23.799) and control and user plane separation (CUPS) work for the control and user plane split (TR 23.714). This implies more overload and signaling in the core network (CN).

Finally, this mechanism is a workaround because there is no direct protocol between the UE and the PDN-GW. Making it generic enough to support other authentication methods would be technically challenging, especially since many methods have strict recommendations and requirements on the transport layer.

Running the secondary authentication on the user plane (UP), once it is set up is presented. A limited UP session may be run for the secondary authentication procedure, rather than allowing full access to the PDN. Once the secondary authentication is completed, a limited UP session may be upgraded to one having full access to a data network. The use of an extensible authentication protocol (EAP), as defined in RFC3748, is also presented. The EAP is used for authentication between the UE and a potentially external AAA server, where an NG-UP function (UPF), playing a similar role to that of the PDN-GW in LTE, endorses the role of an EAP authenticator. EAP payloads would be carried by a protocol for carrying authentication for network access (PANA), as defined in RFC5191, which protocol is IP-based. Another alternative is that the NG-UPF endorses the role of the EAP server.

The presented solution uses EAP which is widely used and provides support for many authentication methods such as EAP-transport layer security (TLS), EAP-authentication and key agreement (AKA), EAP-tunneled TLS (TTS) and EAP-protected extensible authentication protocol (PEAP). The presented solution is IP-based and thus agnostic to the type of access network (AN). Further, since it is UP based, the secondary authentication can be performed independently on NS specific basis even for scenarios where the NG-UE supports multiple possibly simultaneous NS connectivity. By using EAP, the solution also supports different types of credentials and authentication methods. The EAP exchange may benefit from the protection over an air interface.

The secondary authentication is thus run of the UP bearers once the NG-UE is allocated an IP address. EAP is then used for authentication between the NG-UE and the (potentially external) AAA server where the NG-UPF endorses the role of the EAP authenticator.

Figure 3:
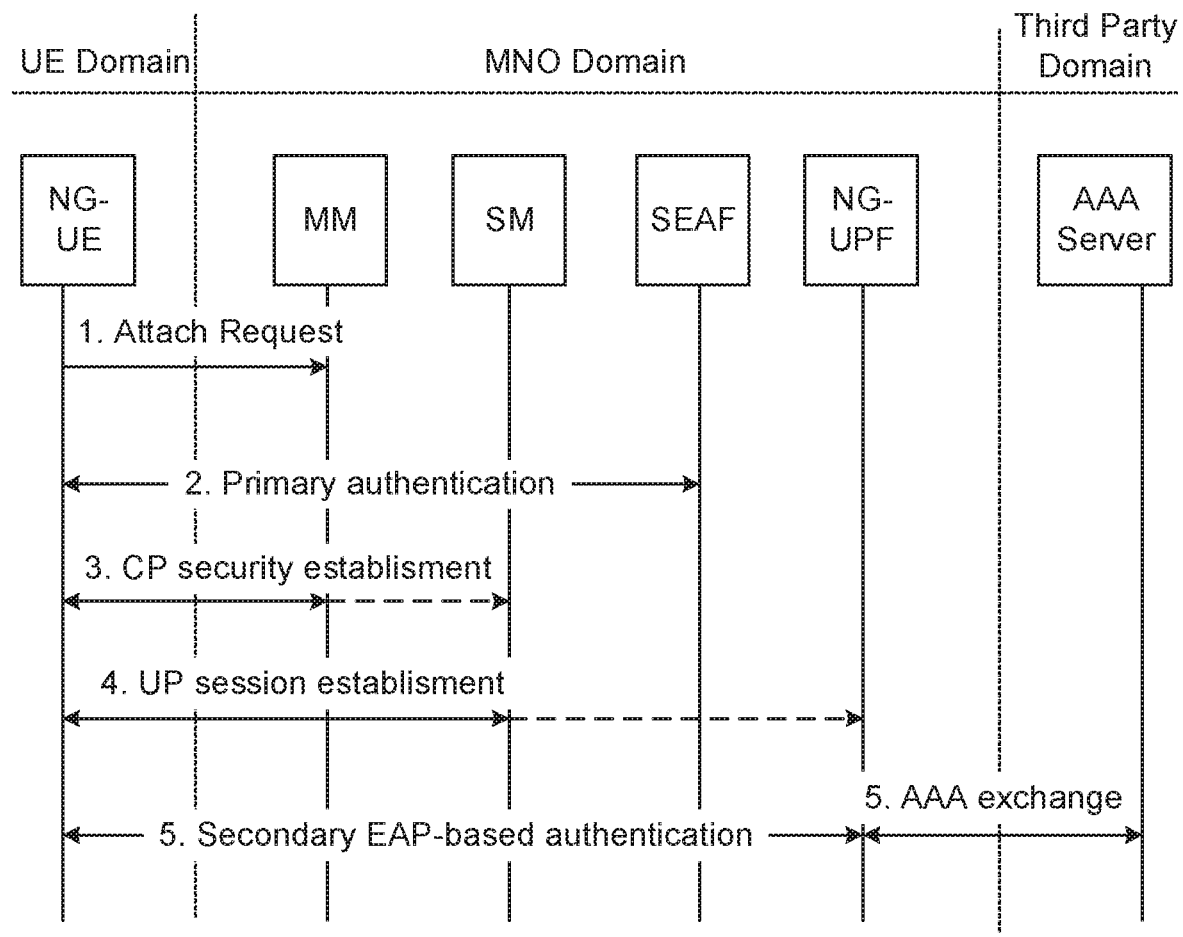
FIG. 3 schematically shows a flow for EAP-based secondary authentication in next generation systems.

An embodiment wherein the NG-UPF acts as an EAP authenticator is presented with reference to FIG. 3.

FIG. 3 shows a flow where an UP-based secondary authentication is run with an external AAA server. The NG-UE is in the UE domain. The NG mobility management function (MMF), the NG session management function (SMF), NG security anchor function (SEAF) and NG-UPF are in the MNO domain. The NG-UPF is an UPF corresponding to a PDN-GW in LTE. The AAA server is in a third party domain. The requirements on the NG-UPF is to include support of PANA and EAP, possibly in addition to the support of all needed UP features of the PDN-GW in LTE such as the support of an SGi interface. In general, a NG-prefix is used for NG system function corresponding to LTE concepts.

In step 1 the NG-UE sends an attach request initiating the attach procedure. The solution presented herein is not dependent on how network slicing is supported, e.g. how the NS instances are selected and how the NG-UE is directed to the proper ones.

In step 2 the NG-UE runs a primary authentication with the NG SEAF. The NG SEAF may further be connected to a NG authentication server function (AUSF). A later, secondary authentication is not dependent on how the NG SEAF and NG MMF are deployed (i.e. collocated or split) nor on the location of the NG SEAF (home or visited public land mobile network (PLMN)).

In step 3 a control plane security is established between the NG-UE and the end point of the NG NAS. The end point of the NG NAS may e.g. be the NG MMF or the NG SMF.

In step 4 a protocol data unit (PDU) session is thereafter established for the transport of UP data between the NG-UE and a data network via the NG-UPF.

Step 4 may be a limited session allowing only for running the secondary authentication procedure. The later, secondary authentication depends on the UP being set up, since it establishes IP connectivity between the NG-UE and the NG-UPF.

In step 5 a secondary EAP-based authentication is run between the NG-UE and the NG-UPF, here endorsing the role of an EAP authenticator and relying on a backend external AAA server. The NG-UE is thereafter granted access in the data network based on the outcome of this authentication procedure.

This presented solution is agnostic on how non-3GPP access will be integrated and whether steps 1 to 3 are executed exactly as depicted here or differently. As long as an IP connectivity is established between the NG-UE and the NG-UPF, which is achieved in step 4, the EAP-based authentication can be run in step 5. In case radio access network (RAN) security has been established before step 5, then the EAP exchange would be protected also on the air interface.

Figure 4:
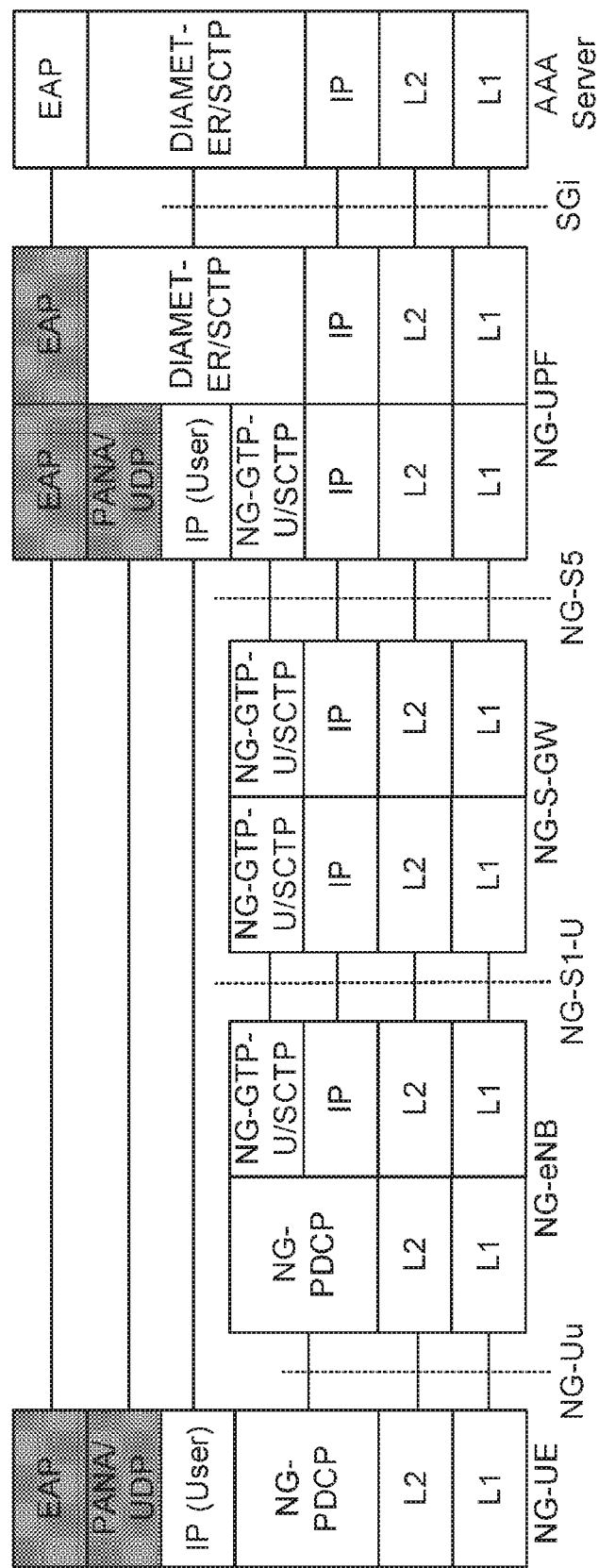
FIGS. 4-5 schematically show protocol architectures for EAP-based secondary authentication for embodiments presented herein.

FIG. 4 shows a protocol architecture for the EAP-based secondary authentication, between the NG-UPF and the NG-UE with NG-UPF as EAP authenticator, as described with reference to FIG. 3. The architecture shown in FIG. 4 is similar to the architecture of LTE regarding the transport of the UP traffic between the UE and the PDN-GW. The greyed boxes highlight the required additional protocol layers to provide the above described EAP-based secondary authentication.

Figure 5:
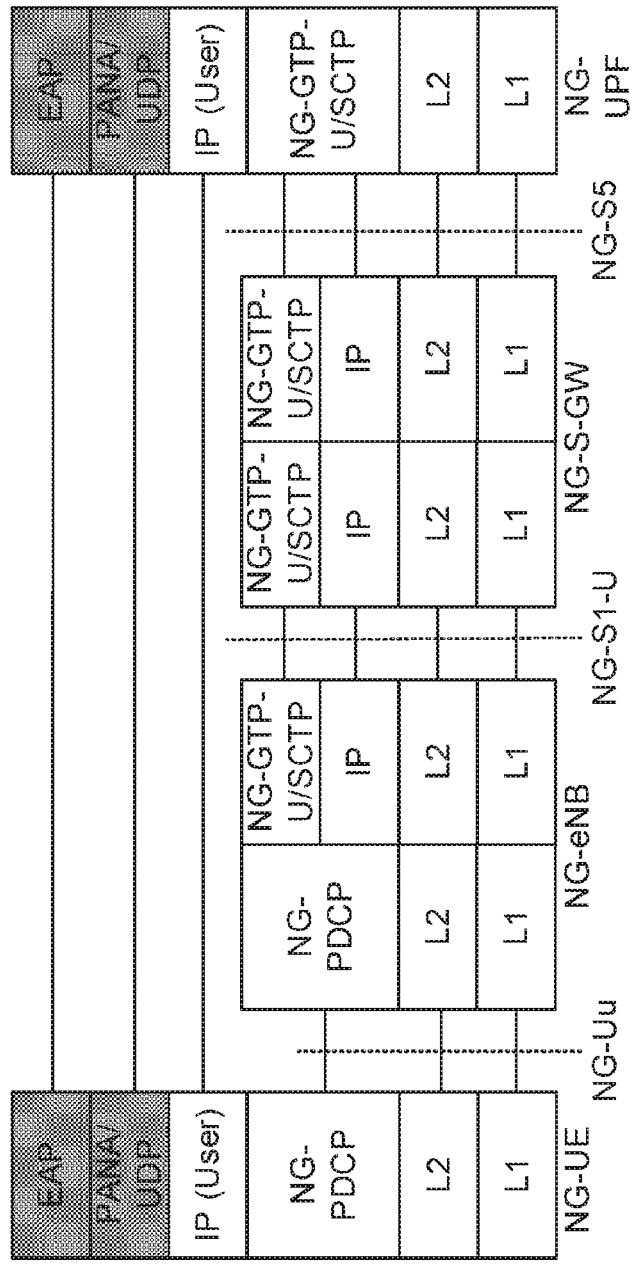

An embodiment with a protocol architecture for EAP-based secondary authentication with NG-UPF as EAP server is presented with reference to FIG. 5.

In this embodiment the NG-UPF terminates the EAP exchange and endorses the role of a complete EAP server. The message flow for this embodiment is thus similar to that of FIG. 3, except that in step 5 an external AAA server is not contacted.

A mechanism for additional or secondary authentication in NG systems between the NG-UE and the NG-UPF terminating the UP traffic within the core network and possibly interacting with an external AAA-server has been presented. The NG-UPF corresponds to the PDN-GW in LTE. The mechanism is based on EAP over IP over UP traffic such that the NG-UPF endorses the EAP authenticator role or the EAP server role.

Figure 1:
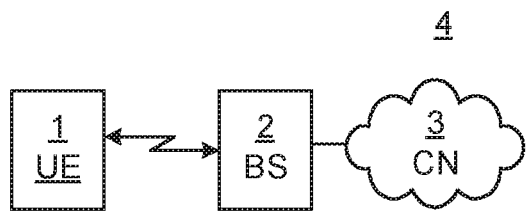
FIG. 1 is a schematic diagram illustrating an environment where embodiments presented herein can be applied.

A communication network 4, wherein embodiments described herein can be implemented is presented in FIG. 1. A user equipment (UE) 1 is wirelessly connectable to a base station (BS) 2. The BS 2 is connected to a core network (CN) 3.

Figure 6A:
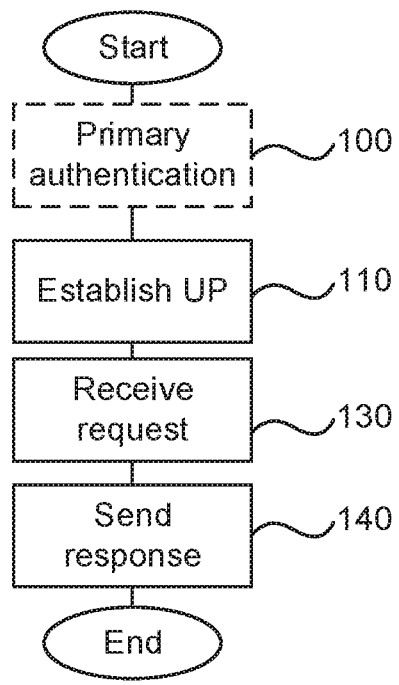
FIGS. 6A-6B are flow charts illustrating methods for embodiments presented herein.

A method, according to an embodiment, for secondary authentication in a network is presented with reference to FIG. 6A. The method is performed by a next generation (NG) user equipment (UE), and comprises establishing 110 a user plane (UP) session or connection with a NG-UP function (UPF), receiving 130 an extensible authentication protocol (EAP) based authentication request from the NG-UPF, and sending 140 an EAP based authentication response to the NG-UPF.

The method may further comprise establishing 100 a primary authentication with a NG SEAF.

The method may further comprise receiving an EAP based authentication result from the UPF.

Figure 6B:
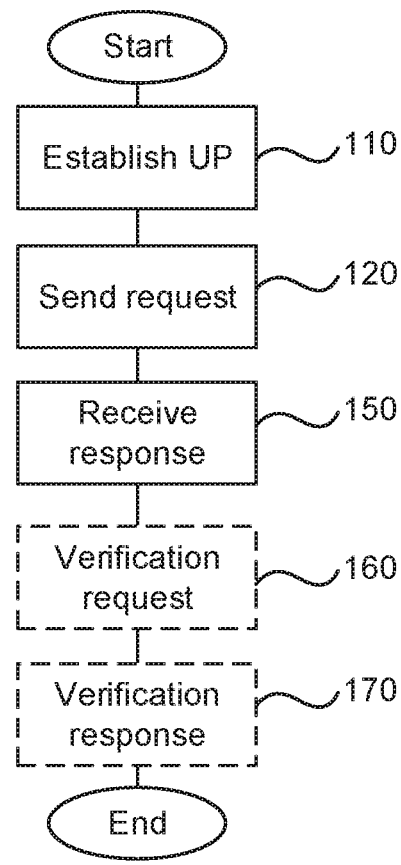

A method, according to an embodiment, for secondary authentication in a core network is presented with reference to FIG. 6B. The method is performed by a next generation (NG)-user plane (UP) function (UPF), and comprises establishing 110 a user plane (UP) session or connection with a NG user equipment (UE), sending 120 an extensible authentication protocol (EAP) based authentication request to the NG UE, and receiving 150 an EAP based authentication response from the NG UE.

The method may further comprise sending 160 a verification request of the received EAP based authentication response to an authentication, authorization, and accounting (AAA) server, and receiving 170 a verification response from the AAA server.

The method may further comprise sending an authentication result to the UE, wherein the authentication is based on the verification response from the AAA server.

Figure 7:
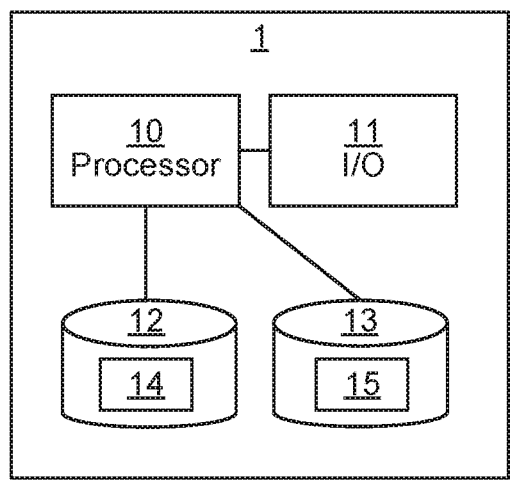
FIGS. 7-8 are schematic diagrams illustrating some components of devices presented herein.

A NG UE, according to an embodiment, for operation in a network is presented with reference to FIG. 7. The NG UE 1 comprises a processor 10, and a computer program product 12, 13. The computer program product stores instructions that, when executed by the processor, causes the NG UE to establish 110 a UP session or connection with a NG-UPF, receive 130 an EAP based authentication request from the NG-UPF, and to send 140 an EAP based authentication response to the NG-UPF.

Figure 8:
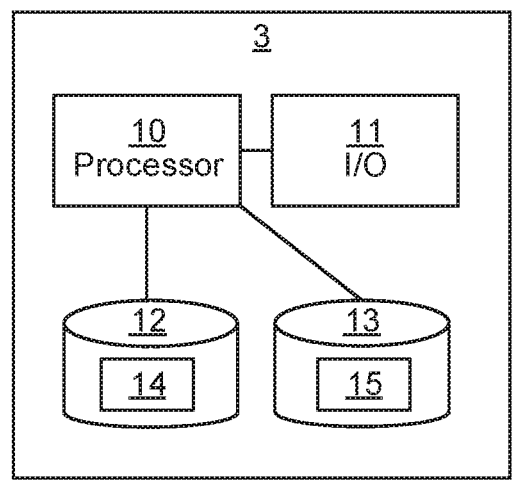

A NG-UPF according to an embodiment, operative in a core network is presented with reference to FIG. 8. The NG-UPF comprises a processor 10, and a computer program product 12, 13 storing instructions that, when executed by the processor, causes the NG-UPF to establish 110 a UP session or connection to a NG UE, send 120 an EAP based authentication request to the NG UE, and to receive 150 an EAP based authentication response from the NG UE.

Figure 9:
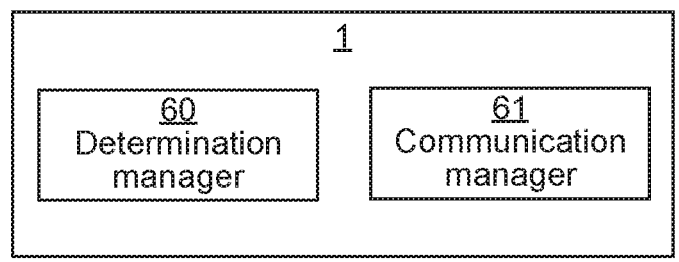
FIGS. 9-10 are schematic diagrams showing functional modules of devices presented herein.

A NG UE, according to an embodiment, for operation in a network, is presented with reference to FIG. 9. The NG UE comprises a communication manager 61 for establishing 110 a UP session or connection with a NG-UPF, receiving 130 an EAP based authentication request from the NG-UPF, and for sending 140 an EAP based authentication response to the NG-UPF.

Figure 10:
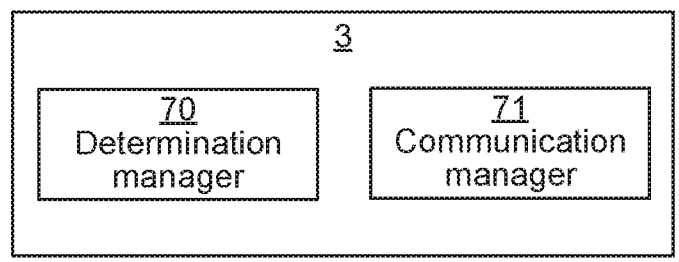

A NG-UPF, according to an embodiment, operative in a network is presented with reference to FIG. 10. The NG-UPF comprises a communication manager 71 for establishing 110 a UP session or connection with a NG UE, sending 120 an EAP based authentication request to the NG UE, and for receiving 150 an EAP based authentication response from the NG UE.

A computer program 14, 15, according to an embodiment, for secondary authentication in a network is presented. The computer program comprises computer program code which, when run on a NG UE, causes the NG UE to establish 110 a UP session or connection with a NG-UPF, receive 130 an EAP based authentication request from the NG-UPF, and to send 140 an EAP based authentication response to the NG-UPF.

A computer program 14, 15, according to an embodiment, for secondary authentication in a network is presented. The computer program comprises computer program code which, when run on a NG-UPF, causes the NG-UPF to establish 110 a UP session or connection with a NG UE, send 120 an EAP based authentication request to the NG UE, and to receive 150 an EAP based authentication response from the NG UE.

A computer program product 12, 13, according to an embodiment, is presented. The computer program product comprises a computer program 14, 15 as presented above and a computer readable storage means on which the computer program 14, 15 is stored.

FIG. 7 is a schematic diagram showing some components of the NG UE 1. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIGS. 12 and 13.

The memory may be any combination of read and write memory and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the NG UE 1.

The NG UE 1 may further comprise an input/output, I/O, interface 11 including e.g. a user interface. The NG UE 1 may further comprise a receiver configured to receive signalling from other nodes, and a transmitter configured to transmit signalling to other nodes (not illustrated). Other components of the NG UE 1 are omitted in order not to obscure the concepts presented herein.

FIG. 9 is a schematic diagram showing functional blocks of the NG UE 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 6A, comprising a communication manager unit 61 and a determination module unit 60. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 61 is for operation in a network. This module corresponds to the establish UP step 110, the receive request step 130 and the send response step 140 of FIG. 6A. This module can e.g. be implemented by the processor 10 of FIG. 7, when running the computer program.

The determination manager 60 is for operation in a network. This module corresponds to the primary authentication step too of FIG. 6A. This module can e.g. be implemented by the processor 10 of FIG. 7, when running the computer program.

FIG. 8 is a schematic diagram showing some components of the NG-UPF 3. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIG. 6B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the NG-UPF 3.

The NG-UPF 3 may further comprise an input/output, I/O, interface 11 including e.g. a user interface. The NG-UPF 3 may further comprise a receiver configured to receive signalling from other nodes, and a transmitter configured to transmit signalling to other nodes (not illustrated). Other components of the NG-UPF 3 are omitted in order not to obscure the concepts presented herein. FIG. 10 is a schematic diagram showing functional blocks of the NG-UPF 3. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6B, comprising a communication manager unit 71 and a determination manager unit 70. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 71 is for operation in a core network. This module corresponds to the establish UP step 110, the send request step 120, and the receive response step 150 of FIG. 6B. This module can e.g. be implemented by the processor 10 of FIG. 8, when running the computer program.

The determination manager unit 70 is for operation in a core network. This module corresponds to the verification request step 160 and the verification response step 170 of FIG. 6B. This module can e.g. be implemented by the processor 10 of FIG. 8, when running the computer program.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The following are certain enumerated embodiments further illustrating various aspects the disclosed subject matter.

1. A method for secondary authentication in a network, performed by a next generation (NG) user equipment (UE), the method comprising: establishing (110) a user plane (UP) session or connection with a NG-UP function (UPF);

receiving (130) an extensible authentication protocol (EAP) based authentication request from the UP NG-UPF; and sending (140) an EAP based authentication response to the UP NG-UPF.

2. The method according to item 1, further comprising:
establishing (110) a primary authentication with a NG-security anchor function (SEAF).

3. A method for secondary authentication in a network, performed by a next generation (NG)-user plane UP function (UPF), the method comprising:

establishing (110) a UP session or connection to a NG-user equipment (UE);

sending (120) an extensible authentication protocol (EAP) based authentication request to the NG UE; and receiving (150) an EAP based authentication response from the NG UE.

4. The method according to item 3, further comprising:
sending (160) a verification request of the received EAP based authentication response to an authentication, authorization, and accounting (AAA) server; and receiving (170) a verification response from the AAA server.

5. A next generation (NG) user equipment (UE) for operation in a network, the NG UE comprising:

a processor (10); and a computer program product (12, 13) storing instructions that, when executed by the processor, causes the NG UE to:

establish (110) a user plane (UP) session or connection with a NG-UP function (UPF);

receive (130) an extensible authentication protocol (EAP) based authentication request from the NG-UPF; and send (140) an EAP based authentication response to the NG-UPF.

6. The NG user equipment (UE) according to item 5, the NG UE further caused to:

establish (100) a primary authentication with a NG security anchor function (SEAF).

7. A next generation (NG)-user plane (UP) function (UPF) operative in a network, the NG-UPF comprising:

a processor (10); and a computer program product (12, 13) storing instructions that, when executed by the processor, causes the NG-UPF to:

establish (110) a UP session or connection with a NG-user equipment (UE);

send (120) an extensible authentication protocol (EAP) based authentication request to the NG UE; and receive (150) an EAP based authentication response from the NG UE.

8. The NG user plane (UP) function (UPF) according to item 7, the NG-UPF further caused to:

send (160) a verification request of the received EAP based authentication response to an authentication, authorization, and accounting (AAA) server; and receive (170) a verification response from the AAA server.

9. A next generation (NG) user equipment (UE) for operation in a network, the NG UE comprising:

a communication manager (61) for establishing (110) a user plane (UP) session or connection with a NG-UP function (UPF), receiving (130) an extensible authentication protocol (EAP) based authentication request from the NG-UPF, and sending (140) an EAP based authentication response to the NG-UPF.

10. A next generation (NG)-user plane (UP) function (UPF) operative in a network, the NG-UPF comprising:

a communication manager (71) for establishing (110) a user plane (UP) session or connection with a NG user equipment (UE), sending (120) an extensible authentication protocol (EAP) based authentication request to the NG UE, and receiving (150) an EAP based authentication response from the NG UE.

11. A computer program (14, 15) for secondary authentication in a network, the computer program comprising computer program code which, when run on a next generation (NG) user equipment (UE), causes the NG UE to:

establish (110) a user plane (UP) session or connection with a NG-UP function (UPF);

receive (130) an extensible authentication protocol (EAP) based authentication request from the NG-UPF; and send (140) an EAP based authentication response to the NG-UPF.

12. A computer program (14, 15) for secondary authentication in a network, the computer program comprising computer program code which, when run on a next generation (NG)-user plane (UP) function (UPF), causes the NG-UPF to:

establish (110) a user plane (UP) session or connection to a NG user equipment (UE);

send (120) an extensible authentication protocol (EAP) based authentication request to the NG UE; and receive (150) an EAP based authentication response from the NG UE.

13. A computer program product (12, 13) comprising a computer program (14, 15) according to any one of items 11 to 12 and a computer readable storage means on which the computer program (14, 15) is stored.

The invention claimed is:

1. A method performed by a user equipment, UE, the method comprising:

establishing, by the UE, a primary authentication with a security anchor function;

establishing, by the UE, a user plane session or connection with or via a user plane function, UPF;

receiving, by the UE, an extensible authentication protocol, EAP, based authentication request via the UPF;

sending, by the UE, an EAP based authentication response to the UPF; and receiving, by the UE, an EAP based authentication result via the UPF, the EAP based authentication result based on a verification response from an external authentication, authorization, and accounting, AAA, server.

2. The method of claim 1, wherein the UE is a next generation UE.

3. The method of claim 1, wherein the UPF is a next generation UPF.

4. The method of claim 1, wherein the UE refrains from transmitting sensitive information prior to establishing the primary authentication, and wherein responsive to receiving the EAP based authentication request, the UE transmits the sensitive information to the UPF.

5. The method of claim 4, wherein establishing the user plane session or connection with or via the UPF comprises indicating to the UPF a ciphering format, and wherein the UE transmits the sensitive information to the UPF in the ciphered format.

6. The method of claim 1, wherein the external AAA server is in a second network external to the network.

7. The method of claim 1, wherein the user plane session or connection with or via the UPF comprises a limited session or limited connection.

8. A method performed by a user plane function, UPF, the method comprising:
- establishing, by the UPF, a user plane session or connection to a user equipment, UE;
- sending, by the UPF, an extensible authentication protocol, EAP, based authentication request to the UE;
- receiving, by the UPF, an EAP based authentication response from the UE;
- forwarding, by the UPF, the EAP based authentication response to an external authentication, authorization, and accounting, AAA, server;
- receiving, by the UPF, a verification response from the external AAA server; and
- sending, by the UPF, an authentication result to the UE, wherein the authentication is based on the verification response from the external AAA server.

9. The method of claim 8, wherein the UE is a next generation UE.

10. The method of claim 8, wherein the UPF is a next generation UPF.

11. A user equipment, UE, for operation in a network, the UE comprising:
- a processing circuit; and
- a memory device having instructions stored therein that, when executed by the processing circuit, causes the UE to:
  - establish a primary authentication with a security anchor function;
  - establish a user plane session or connection with or via a user plane function, UPF;
  - receive an extensible authentication protocol, EAP, based authentication request via the UPF;
  - send an EAP based authentication response to the UPF; and
  - receive an EAP based authentication result via the UPF, the EAP based authentication result based on a verification response from an external authentication, authorization, and accounting, AAA, server.

12. The UE of claim 11, wherein the UE is a next generation UE.

13. The UE of claim 11, wherein the UPF is a next generation UPF.

14. A user plane function, UPF, operative in a network, the UPF comprising:
- a processing circuit; and
- a memory device having instructions stored therein that, when executed by the processing circuit, causes the UPF to:
  - establish a user plane session or connection with a user equipment, UE;
  - send an extensible authentication protocol, EAP, based authentication request to the UE;
  - receive an EAP based authentication response from the UE;
  - forward the EAP based authentication response to an external authentication, authorization, and accounting, AAA, server;
  - receive a verification response from the external AAA server; and
  - send an authentication result to the UE, wherein the authentication is based on the verification response from the external AAA server.

15. The UPF of claim 14, wherein the UPF is a next generation UPF.

16. The UPF of claim 14, wherein the UE is a next generation UE.

17. A non-transitory computer-readable medium having instructions stored therein that are executable by a processing circuit for a user equipment, UE, to cause the UE to:
- establish a primary authentication with a security anchor function;
- establish a user plane session or connection with or via a user plane function, UPF;
- receive an extensible authentication protocol, EAP, based authentication request via the UPF;
- send an EAP based authentication response to the UPF; and
- receive an EAP based authentication result via the UPF, the EAP based authentication result based on a verification response from an external authentication, authorization, and accounting, AAA, server.

18. The non-transitory computer-readable medium of claim 17, wherein the UE is a next generation, NG, UE, and wherein the UPF is a NG UPF.

19. A non-transitory computer-readable medium having instructions stored therein that are executable by a processing circuit for a user plane function, UPF, to cause the UPF to:
- establish a user plane session or connection to a user equipment, UE;
- send an extensible authentication protocol, EAP, based authentication request to the UE;
- receive an EAP based authentication response from the UE;
- forward the EAP based authentication response to an external authentication, authorization, and accounting, AAA, server
- receive a verification response from the external AAA server; and
- send an authentication result to the UE, wherein the authentication is based on the verification response from the external AAA server.

20. The non-transitory computer-readable medium of claim 19, wherein the UPF is a next generation ("NG") UPF, and
- wherein the UE is a NG UE.

* * * * *

UNITED STATES PATENT AND TRADEMARK OFFICE
CERTIFICATE OF CORRECTION

PATENT NO. : 10,904,756 B2  
APPLICATION NO. : 16/796060  
DATED : January 26, 2021  
INVENTOR(S) : Ben Henda et al.

Page 1 of 2

It is certified that error appears in the above-identified patent and that said Letters Patent is hereby corrected as shown below:

In the Specification

In Column 1, Line 9, delete "2018," and insert -- 2018, now Pat. No. 10,609,556, --, therefor.

In Column 1, Line 62, delete "is to presented." and insert -- is presented. --, therefor.

In Column 2, Lines 63-64, delete "or to connection" and insert -- or connection --, therefor.

In Column 3, Line 23, delete "UE The" and insert -- UE. The --, therefor.

In Column 3, Line 33, delete "UE The" and insert -- UE. The --, therefor.

In Column 3, Line 43, delete "UE" and insert -- UE. --, therefor.

In Column 3, Lines 43-44, delete "The UE . . . . . UPF." and insert the same at Line 44, as a new paragraph.

In Column 3, Line 44, delete "UE The" and insert -- UE. The --, therefor.

In Column 6, Line 17, delete "EAP-tunneled TLS (TTS)" and insert -- EAP-tunneled TLS (TTLS) --, therefor.

In Column 9, Line 57, delete "step too" and insert -- step 100 --, therefor.

In Column 10, Lines 27-45, delete "FIG. 10 is . . . . . modules." and insert the same at Line 28, as a new paragraph.

In Column 10, Line 63, delete "aspects the" and insert -- aspects of the --, therefor.

In Column 11, Line 7, delete "establishing (110)" and insert -- establishing (100) --, therefor.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*

In the Claims

In Column 14, Line 44, in Claim 19, delete "AAA, server" and insert -- AAA, server; --, therefor.